United States Patent [19]

Dienes

[11] Patent Number: 4,742,181
[45] Date of Patent: May 3, 1988

[54] AERIAL CABLE WITH CLOSURE DRAIN AND VENT AND METHOD OF FORMING SAME

[75] Inventor: Zoltan B. Dienes, Annandale

[73] Assignee: Thomas & Betts Corporation, Bridgewater, N.J.

[21] Appl. No.: 7,837

[22] Filed: Jan. 27, 1987

[51] Int. Cl.⁴ .................. H02G 1/02; H02G 15/08
[52] U.S. Cl. .................... 174/16 R; 156/49; 174/93
[58] Field of Search ............ 174/16 R, 92, 93, 135; 156/49

[56] References Cited

U.S. PATENT DOCUMENTS

| | | | |
|---|---|---|---|
| 2,967,795 | 1/1961 | Bollmeier et al. | 174/76 X |
| 3,138,657 | 6/1964 | Wengen | 174/92 |
| 3,419,669 | 12/1968 | Dienes | 174/93 X |
| 3,499,972 | 3/1970 | Smith | 174/93 X |
| 3,519,728 | 7/1970 | Gillemot | 174/76 |
| 4,484,962 | 11/1984 | Dienes et al. | 174/135 X |

Primary Examiner—Laramie E. Askin
Attorney, Agent, or Firm—Robert M. Rodrick; Salvatore J. Abbruzzese

[57] ABSTRACT

A method and apparatus for closing an exposed area of aerial cable is described. A foraminous barrier is placed around the cable adjacent the exposed area. A cover is placed thereover. The foraminous barrier permits water to pass through the cable without accumulating at the exposed area. However, debris, dirt, and other contaminants are prevented from entering the exposed area.

12 Claims, 4 Drawing Sheets

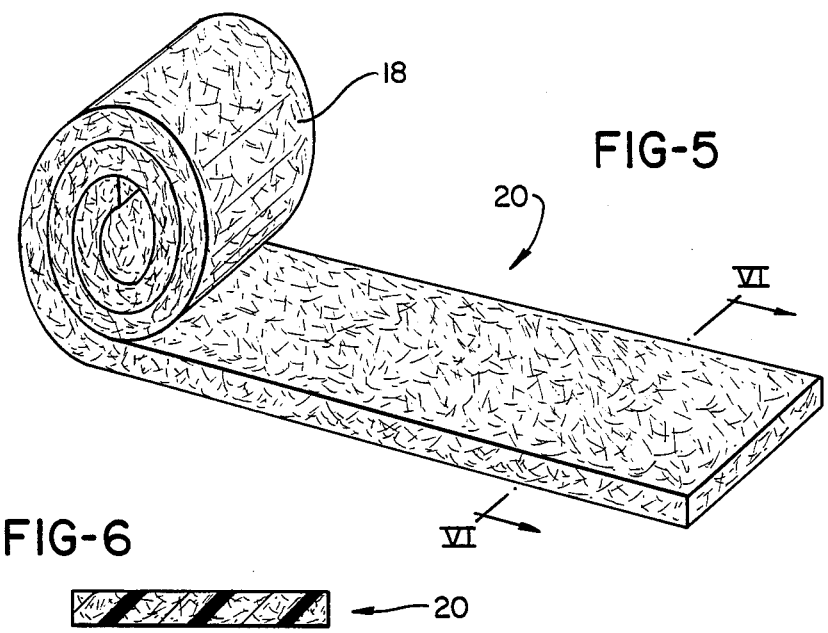
FIG-5
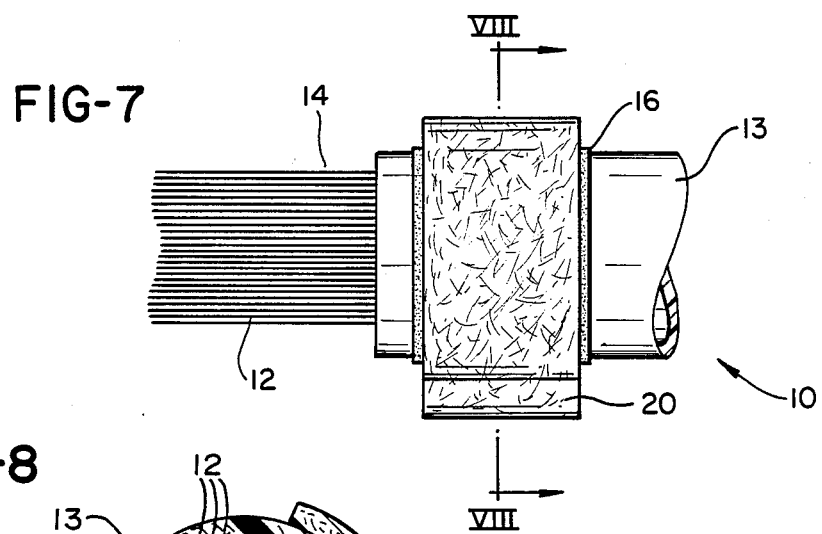
FIG-6
FIG-7
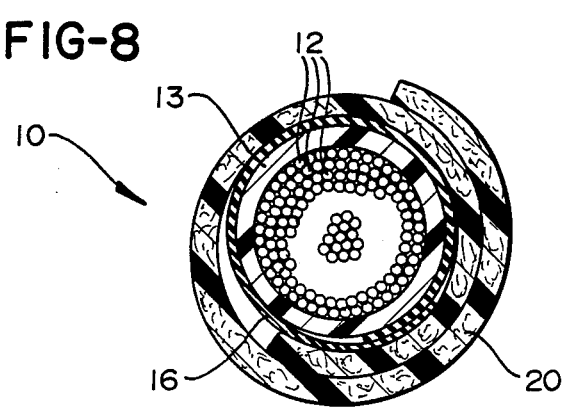
FIG-8

AERIAL CABLE WITH CLOSURE DRAIN AND VENT AND METHOD OF FORMING SAME

FIELD OF THE INVENTION

This invention relates generally to a method and apparatus for covering an exposed portion of an electrical cable and more particularly relates to a method and apparatus for providing a water drain for aerial cable which also permits air to circulate therethrough.

BACKGROUND OF THE INVENTION

Telecommunication cables, which carry telephone signals from point to point, are typically run outdoors suspended between utility poles high above ground level. These cables include many small diameter insulated telephone wires enclosed in an outer insulative jacket. Due to line failure or damage to the cable, it becomes necessary to open the outer insulative jacket of the cable to expose the insulated conductors for repairs or for making interconnections. After entering the cable and making such repairs, the exposed area, called the cable splice, must again be closed to protect the conductors from the environment. It can be appreciated that the cable, including the cable splice, is exposed to outdoor environments such as rain which could damage, or otherwise adversely affect, the conductors or connectors if not properly protected.

While falling rain itself may affect the cable it is standing rainwater which remains in the cable which causes the more deleterious effects. Standing rainwater may collect at the lowest point of the cable span between two utility poles. This may typically occur at the cable splice area. Unless drained, this rainwater may cause short circuits or other problems in the conductor running through the cable or with the connectors therein.

One technique to avoid the problem of rainwater in telephone cables is to sealably cover the splce area thereby preventing rainwater from entering the cable altogether. While in theory this is an acceptable approach, it is extremely difficult to totally prevent entry of rainwater into a cable splice area. Water may enter the cable through either the cable splice or through a damaged portion of the cable away from the splice area. Water so entering the cable will be held at the cable splice area causing a pool of water to accumulate around the conductors and connectors. A second technique used, is to recognize that water may enter the cable jacket and, therefore, provide a drain permitting the water to escape. Most drains currently available are in the form of openings placed in the cable splice area which permit water trapped in the jacket to escape therethrough. Various arrangements of valves, nipples, and tubes may be employed to effectively drain the cable of any accumulated water. These techniques place the drain initially on the undersurface of the cable so that the cable may drain by gravity. However, due to wind, stress, or other influences, the cable tends to rotate about its axis up to 180°. This renders drains of this type useless.

It is, therefore, desirable to provide a cable closure drain which will permit water, which enters the cable jacket, to harmlessly flow through the cable splice area and not accumulate therein, thereby reducing the likelihood of damage to the conductors at the cable splice area. Further, the drain should provide air ventilation which would promote the drying out of any moisture in the cable.

SUMMARY OF THE INVENTION

It is an object of the present invention to provide an improved method and apparatus for covering an exposed portion of an electrical cable.

It is a further object of the present invention to provide a method and apparatus for allowing rainwater to harmlessly pass through a cable splice area and not accumulate thereat.

It is a still further object of the present invention to provide an air vent at the cable splice area to promote air flow therethrough which would air-dry any moisture at the cable splice area.

In the efficient attainment of the foregoing and other objects, the present invention provides a cover for an exposed portion of an electrical cable. The cover is an elongate member disposed around the exposed portion of the cable. The cover has a pair of opposed open ends permitting passage of the cable therethrough. Barrier means is disposed around the cable at the open ends of the cover substantially closing these ends. The barrier means is formed of a foramainous fluid-permeable member which permits fluid such as rainwater or air to pass therethrough.

As more particularly described by way of a preferred embodiment disclosed herein, the telecommunication cable includes an outer jacket supporting plural insulated conductors therein. A portion of the cable, called the cable splice area, is exposed for repairs. The elongate cover is positioned in a circumscribing manner around the exposed portion of the cable covering the splice area. The open ends of the cover permit passage of the cable therethrough on either side of the exposed portion. The cover and the cable form an annular chamber therebetween. Barrier means in the form of a foraminous plug is provided. This plug is formed from a mesh-like open-celled member having very small openings which render the plug fluid permeable. The plug is disposed in the annular channel around the cable jacket adjacent each side of the exposed portion of the cable. Rainwater, which may fall on the cable and track along the jacket thereof, may pass through the foraminous plug and into the exposed area. However, the rainwater will continue the flow therethrough and harmlessly pass through the foraminous plug out from the other end of the cover. This arrangement prevents the accumulation of rainwater at the cable splice area while promoting air ventilation therein.

The foraminous plug is formed so that while fluid such as rainwater or air may freely pass therethrough, other contaminants such as insects, small animals, rocks. and the like, cannot enter the cover.

BRIEF DESCRIPTION OF THE DRAWINGS

FIG. 5 is a perspective view of the foraminous member used in accordance with the present invention, shown in roll form.

FIG. 6 is a section of the foraminous member of FIG. 5 taken through the lines VI—VI.

FIG. 7 is a side elevational view of the telecommunication cable, similar to that of FIG. 3, showing further steps of the present invention.

FIG. 8 is a vertical section of the cable of FIG. 7 taken along the lines VIII—VIII.

DETAILED DESCRIPTION OF THE PREFERRED EMBODIMENTS

Figure 1:
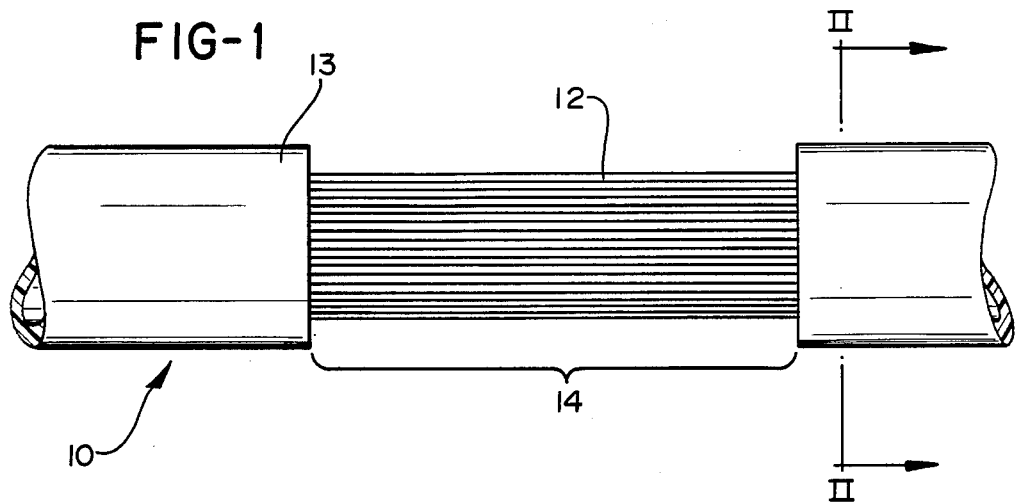
FIG. 1 is a side elevational view of an extent of insulated telecommunication cable with a central area exposed revealing insulated conductors extending therethrough.
Figure 2:
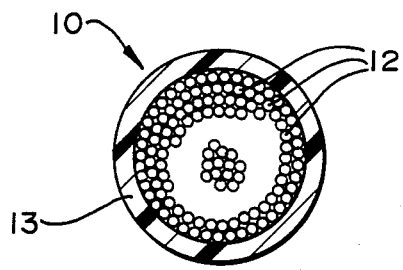
FIG. 2 is a vertical section of the cable of FIG. 1 taken through the lines II—II.

Referring to FIG. 1 there is shown an extent of telecommunication cable 10, which includes a plurality of insulated conductors 12 extending therethrough. Conductors 12 are of conventional construction each being formed of copper having plastic insulation thereover. The conductors 12 are enclosed in an outer insulative jacket 13 which is also formed of plastic. A portion of jacket 13 is typically broken away to create an exposed area 14 for maintenance, repair or splice purposes, which may be performed in a manner well known in the art. The exposed area 14 is typically referred to as the cable splice or cable splice area. As described herein, the length of the exposed area 14 may be from 4 inches to 30 inches. After making any repairs or splices at the cable splice area, the exposed area 14 is covered for protective purposes.

Figure 3:
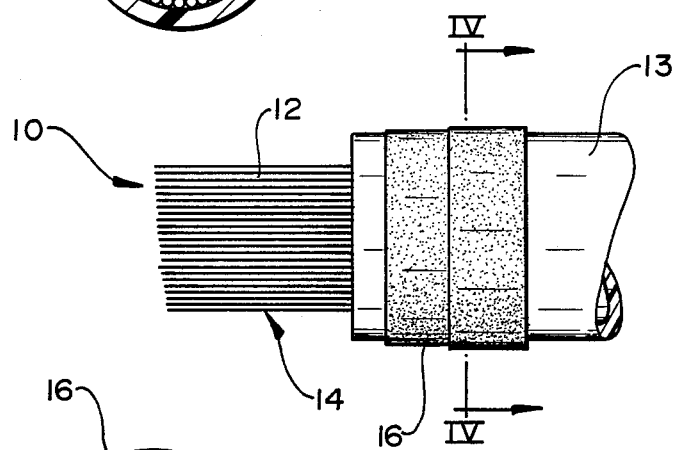
FIG. 3 is a side elevational view of a portion of the telecommunication cable of FIG. 1 showing one side of the splice area.
Figure 4:
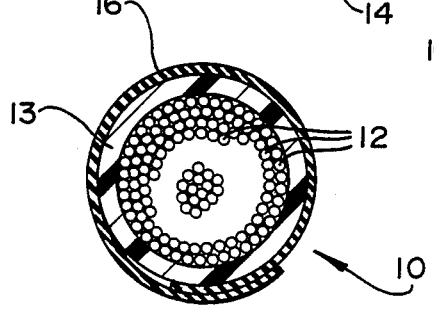
FIG. 4 is a vertical section of the cable of FIG. 3 taken through the lines IV—IV.

Referring to FIGS. 3 and 4, the first step in preparing a suitable cover for cable 10 may be shown. In the following description, references made to FIGS. 3, 7, and 10, for simplicity of explanation, will show only one half of cable 10 adjacent exposed area 14. It can be appreciated that the half not shown is prepared in a manner similar to that which is described. As shown in FIGS. 3 and 4, the cable jacket 13, adjacent exposed area 14, is wrapped with one or more layers of uncured rubber tape 16 having opposed tacky sides. Tape 16 is typically supplied in roll form (not shown) and may be of the type commonly known as DR tape. Tape 16 is applied over the cable jacket 13 adjacent exposed area 14 in a conventional overlapping fashion. The tape 16 may be applied in one or more wraps. The amount of tape 16 used is left to the skill and desire of the particular installer. It is further contemplated that any pliable sealant, not necessarily in tape form, may be employed.

Referring now to FIGS. 5 and 6, a roll 18 of a foraminous web 20 is shown. Web 20 is an open-celled member including many interleaved strands of synthetic fibers which are formed in a mesh-like configuration held together by glue or other similar resin. Specific properties of web 20 which make it suitable for use with the present invention includes its fluid permeability, compressibility, and relatively light weight. The arrangement of fibers forming web 20 provides very small intersticial openings which permit fluid passage therethrough. However, these openings are of such a small extent that other contaminants such as solid debris, insects, small animals and the like, could not pass thorough the intersticial openings between the fibers. Further, while the web 20 is compressible, it does not lose any permieability in compression. As will be described in detail hereinbelow, web 20 may be compressibly wrapped around cable 10, yet will remain fluid permeable. Web 20 is commercially available as a hardware or household item useful for various purposes such as for scouring or cleaning or for light sanding of wood or metal. One use of this material in a commercial setting is in a household scouring pad commercially sold under the trade name "Scrunge". An alternate construction of web 20 includes the use of a foam sponge which is resin impregnated for stiffness. Again, the construction should be fluid permeable, yet solid impermeable. In the present invention web 20 is used in a form having a transverse extent between 1 inch and 3 inches and is supplied in continuous roll form.

Referring now to FIGS. 7 and 8, web 20 is applied over tape 16 on cable jacket 13. Web 20 is applied in an overlapping fashion around tape 16. One or more wraps of web 20 may be placed on cable 10 as may be needed for the particular installation. As can be seen from FIG. 7, with each successive wrap a thicker profile will be achieved. Web 20 may be secured around cable 10 with tape or other fastening means (not shown).

Figure 9:
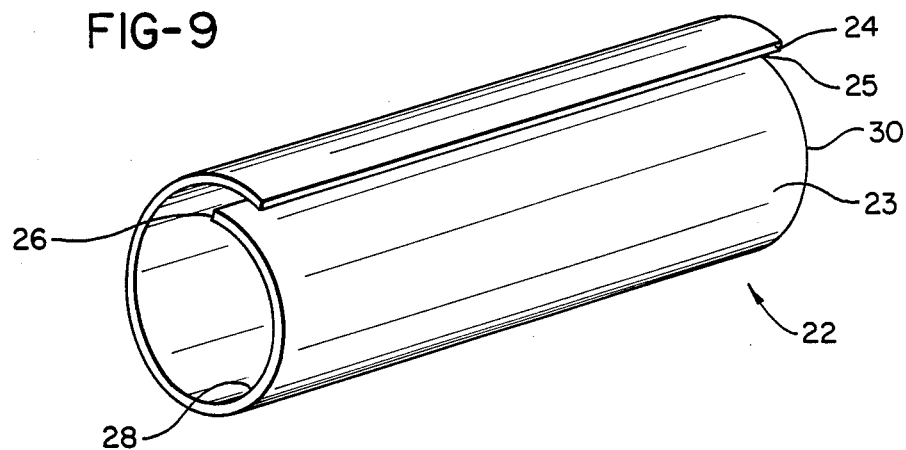
FIG. 9 is a perspective view, showing the cover employed in the present invention.

Referring now to FIG. 9, a cover 22 is shown which is used to enclose the exposed area 14 of cable 10 (FIG. 1). Cover 22 is an elongate, substantially cylindrical tube 23 having opposed open ends 28 and 30. Cover 22 is formed of a plastic material such as U.V. resistent polyvinyl chloride. A longitudinal split location 25 on tube 23 permits the cover 22 to be opened longitudinally. The split location 25 permits cover 22 to be placed around a central section of cable 10 by opening the tube 23 thereat and wrapping the cover 22 around cable 10. Overlapped edges 24 and 26 of cover 22 permit the cover 22 to be range taking thereby accommodating various diameter cables.

Figure 10:
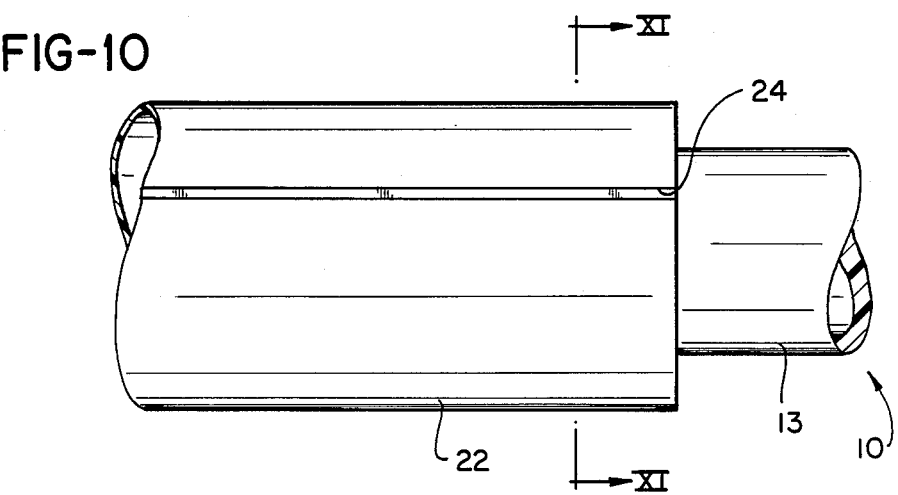
FIG. 10 is a side elevational view, similar to that in FIG. 3, showing the cover of FIG. 9 disposed thereover.
Figure 11:
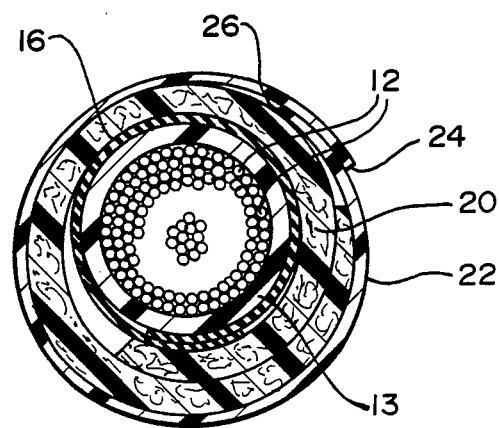
FIG. 11 is a vertical section of the cable of FIG. 10 taken along the lines of XI—XI.

FIGS. 10 and 11 show cover 22 disposed over cable 10. Cover 22 is typically placed over the exposed area 14 (FIG. 1) of cable 10 with the edges 24 and 26 overlapped. The cover then may be manually compressed, thereby compressing web 20. As web 20 is readily compressible, it also provides a range taking feature allowing various sizes of covers 22 to be disposed over cable 10. Cover 22 is then suitably secured with cable ties, tape, or other fastening devices (not shown) around cable 10.

Figure 12:
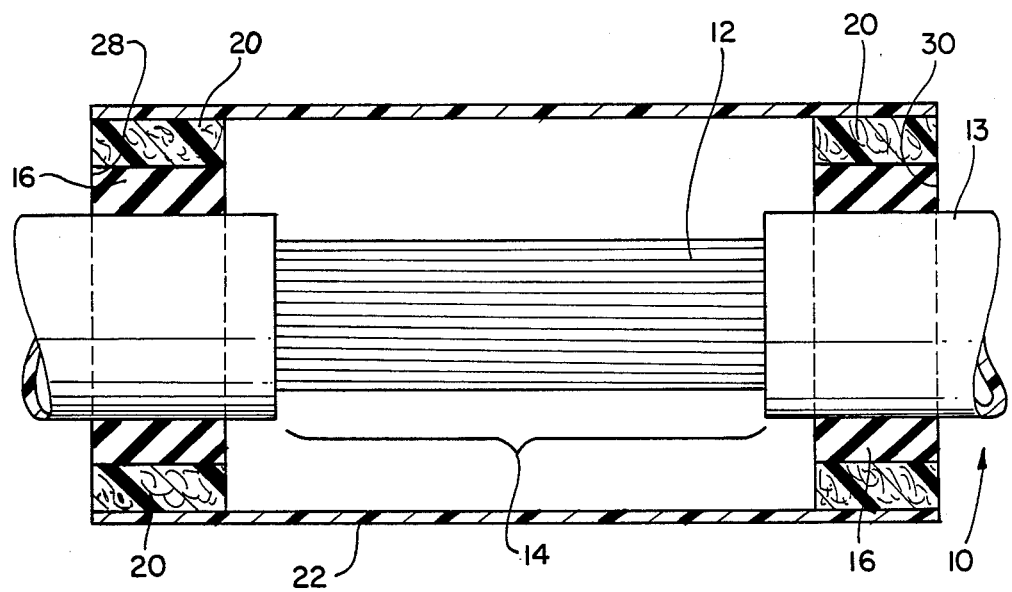
FIG. 12 is a schematic representation of the cable cover and drain of the present invention.
Figure 13:
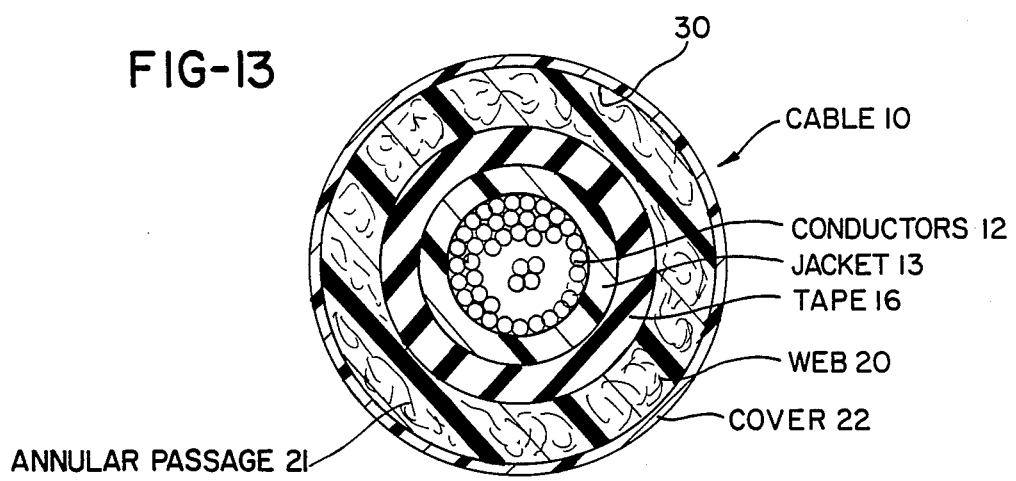
FIG. 13 is a sectional schematic representation of the cable of FIG. 12.

FIGS. 12 and 13 show schematically, the arrangement of components used in the present invention. It can be seen that web 20, disposed between cover 22 and tape 16, forms a barrier or plug at the open ends 28 and 30 of cover 22. The barrier formed by web 20 is fluid permeable permitting entry of water tracking along cable 10. Also, web 20 permits water in cover 22 to pass out the open ends 28 and 30. A web 20 is placed next adjacent cover 22, no standing water can accumulate in cover 22. Also, the barrier formed by web 20 allows air to pass through cover 22 thereby ventilating the exposed area 14. Air circulation in this manner tends to dry out any residual moisture in cover 22. Typically, when supported between utility poles, cable 10 will be tilted slightly, thus water will run by gravity from the higher side of the cable 10 to the lower side. Web 20 provides for both entry and exit of water along this gravitational path. Any water tracking along cable 10 will be readily admitted to the exposed area 14, but will not be permitted to accumulate therearound. Rather, the water will continue to flow downward out from the other end of cover 22. As mentioned above, while fluid flow is permitted through web 20, the intersticial openings in web 20 are so small that dirt, debris, or other contaminants such as small animals or insects will not be permitted into the exposed area 14. This suitably protects the exposed conductors 12 from these contaminants.

FIG. 13 shows schematically, a substantially annular passage 21 coextensive with web 20, which permits fluid flow into cover 22. This annular passage 21 is spaced substantially from the conductors 12 supported inside jacket 13. Accordingly, the fluid flow through web 20 is spaced substantially from conductors 12. Thus, the water flow should not contact the conductors, minimizing any risks of short circuiting or other adverse effects on the conductors 12.

Modification of many of the above-described steps and elements may be within the contemplation of the present invention. Web 20 may be formed of any of a wide variety of items such as a plastic screen, wool, or any other fluid permeable barrier. Also, web 20 may be used in place of tape 16 if so desired.

Various other modifications to the depicted and discussed embodiments will now be evident to those skilled in the art and may be introduced without departing from the invention. The true scope of the invention is set forth in the following claims.

I claim:

1. In combination, an electrical cable having an exposed extent along its length and an apparatus for enclosing said exposed extent comprising:
   an elongate cover disposed in circumscribing relation around said exposed extent of said cable, said cover having a pair of opposed ends with said cable passing therethrough, each of said ends of said cover and said cable defining an annular channel thereat, said cable and said cover further defining therebetween a continuous fluid passage between and through said ends of said cover; and
   barrier means disposed in each of said annular channels, said barrier means being fluid permeable to permit ingress and egress of fluid into said passage and being solid impermeable to prevent entry of contaminants into said passage.

2. A combination in accordance with claim 1 wherein said barrier means includes a foraminous plug disposed in each of said annular channels.

3. A combination in accordance with claim 2 further including securement means for securing said cover around said cable and said plugs.

4. A combination in accordance with claim 3 wherein said securement means compressibly secures said cover around said cable and said plugs.

5. A combination in accordance with claim 4 wherein each of said foraminous plugs is compressible and wherein each of said foraminous plugs remains fluid permeable in compression.

6. A combination in accordance with claim 1 wherein said barrier means includes a foraminous plug of fibrous composite material formed in a mesh-like configuration.

7. A method of covering an exposed central area of an elongate electrical cable comprising the steps of:
   providing a longitudinal extent of a foraminous web, said web being fluid permeable and substantially solid impermeable;
   disposing said web around said cable adjacent each side of said exposed area;
   providing a cylindrical cover having a pair of opposed open ends;
   disposing said cover over said exposed area with said open ends being adjacent said web, said web forming a fluid permeable barrier for said cover and
   maintaining a continuous fluid permeable passage through and between said open ends of said cover.

8. A method in accordance with claim 7 wherein said web disposing step includes: wrapping said longitudinal extent
   of said foraminous web around said cable.

9. A method in accordance with claim 8 further including, prior to said wrapping step:
   providing a roll of uncured rubber tape; and
   wrapping said tape around said cable adjacent each side of said exposed area.

10. A method in accordance with claim 9 wherein said web is wrapped around said tape.

11. A method in accordance with claim 10 wherein said cylindrical cover is an elongate member having a longitudinal split location therealong and wherein said cover disposing step includes:
    opening said cover along said split location and;
    wrapping said cover over said cable.

12. A method in accordance with claim 11 further including the step of:
    compressibly securing said cover to said cable.

* * * * *